(12) United States Patent
Suzuki et al.

(10) Patent No.: US 11,487,440 B1
(45) Date of Patent: Nov. 1, 2022

(54) EVALUATION SYSTEM FOR EVALUATING RESOURCE OPERATION OF INFORMATION SYSTEM BY USER

(71) Applicant: HITACHI, LTD., Tokyo (JP)

(72) Inventors: So Suzuki, Tokyo (JP); Hiroshi Hayakawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/388,955

(22) Filed: Jul. 29, 2021

(30) Foreign Application Priority Data

May 12, 2021 (JP) .............................. JP2021-081016

(51) Int. Cl.
  *G06F 3/06* (2006.01)
  *G06F 11/30* (2006.01)
  *G06F 11/34* (2006.01)

(52) U.S. Cl.
  CPC .......... *G06F 3/0619* (2013.01); *G06F 3/0605* (2013.01); *G06F 3/0644* (2013.01); *G06F 3/0683* (2013.01); *G06F 11/3034* (2013.01); *G06F 11/3438* (2013.01)

(58) Field of Classification Search
  CPC .... G06F 3/0605; G06F 3/0619; G06F 3/0644; G06F 3/0683; G06F 11/3034; G06F 11/3438
  See application file for complete search history.

(56) References Cited

U.S. PATENT DOCUMENTS

| | | | |
|---|---|---|---|
| 8,880,801 B1 * | 11/2014 | Robins | G06F 11/1092 711/170 |
| 2008/0177877 A1 | 7/2008 | Naono et al. | |
| 2010/0114634 A1 * | 5/2010 | Christiansen | G06Q 30/018 705/317 |
| 2013/0006701 A1 * | 1/2013 | Guven | G06Q 10/0635 705/7.28 |
| 2019/0182115 A1 * | 6/2019 | Wilshinsky | G06F 3/0607 |
| 2021/0211642 A1 * | 7/2021 | Won | H04N 21/6582 |

FOREIGN PATENT DOCUMENTS

| | | |
|---|---|---|
| JP | 2008-158959 A | 7/2008 |
| JP | 2008-181279 A | 8/2008 |

OTHER PUBLICATIONS

Japanese Office Action dated Aug. 23, 2022 for Japanese Patent Application No. 2021-081016.

* cited by examiner

*Primary Examiner* — Eric T Oberly
(74) *Attorney, Agent, or Firm* — Volpe Koenig

(57) ABSTRACT

Disclosed is an evaluation system for evaluating a resource operation of an information system by a user. The evaluation system includes one or more arithmetic units, and one or more storage devices. The one or more storage devices are configured to store risk management information for managing an erroneous operation risk evaluation index relating to the resource operation of the information system. The one or more arithmetic units are configured to: receive operation information indicating a first resource operation designated by a first user, and evaluate an erroneous operation risk of the first resource operation based on the first resource operation and the risk management information.

13 Claims, 12 Drawing Sheets

| # | TARGET RESOURCE TYPE | RISK FACTOR |
|---|---|---|
| 1 | VOLUME | 1 |
| 2 | POOL | 2 |
| 3 | COPY PAIR | 1 |
| ... | ... | ... |

STORAGE RESOURCE RISK MANAGEMENT TABLE

FIG. 4

| # | TARGET RESOURCE TYPE | OPERATION TYPE | RISK FACTOR |
|---|---|---|---|
| 1 | COMMON | NEW CREATION | 1 |
| 2 | | DELETION | 2 |
| 3 | | ATTRIBUTE CHANGE | 1 |
| 4 | VOLUME | SHREDDING | 2 |
| 5 | POOL | EXPANSION | 2 |
| 6 | | REDUCTION | 2 |
| 7 | COPY PAIR | BACKUP | 1 |
| 8 | | RESTORATION | 2 |
| 9 | | DIVIDING | 1 |
| ... | ... | ... | ... |

STORAGE OPERATION RISK MANAGEMENT TABLE

FIG. 5

STORAGE STATE RISK MANAGEMENT TABLE

RISK EVALUATION RESULT EXAMPLES

| # | TARGET RESOURCE TYPE | RISK FACTOR A |
|---|---|---|
| 1 | VIRTUAL MACHINE | 2 |
| 2 | MEMORY OF VIRTUAL MACHINE | 1 |
| 3 | PROCESSOR OF VIRTUAL MACHINE | 1 |
| 4 | DISK OF VIRTUAL MACHINE | 1 |
| ... | ... | ... |

SERVER RESOURCE RISK MANAGEMENT TABLE

SERVER OPERATION RISK MANAGEMENT TABLE

SERVER STATE RISK MANAGEMENT TABLE

USER-ASSIGNED TENANT MANAGEMENT TABLE

USER-RELATED RISK MANAGEMENT TABLE

| # | EXAMPLE | PLURALITY OF TENANTS ARE BEING OPERATED? | RISK CALCULATION FORMULA | COMPREHENSIVE RISK | CONFIRMATION SCREEN |
|---|---|---|---|---|---|
| 1 | CREATE POOL VOLUME FOR USE IN POOL EXPANSION (UNRESTORABLE) | NO | (2x2x1) x 1 | 4 | TO BE DISPLAYED |
| 2 | PERFORM SHREDDING OF VOLUME FOR WHICH THERE IS BACKUP (RESTORABLE) | YES | (1x2x1) x 2 | 4 | TO BE DISPLAYED |
| 3 | PERFORM SHREDDING OF VOLUME FOR WHICH THERE IS NO BACKUP (UNRESTORABLE) | NO | (1x2x2) x 1 | 4 | TO BE DISPLAYED |
| 4 | PERFORM SHREDDING OF VOLUME FOR WHICH THERE IS BACKUP (RESTORABLE) | NO | (1x2x1) x 1 | 2 | NOT TO BE DISPLAYED |
| 5 | ALLOCATE VOLUME (RESTORABLE BY ERASURE) | NO | (1x1x1) x 1 | 2 | NOT TO BE DISPLAYED |

RISK EVALUATION RESULT EXAMPLES

*FIG. 16*

EVALUATION SYSTEM FOR EVALUATING RESOURCE OPERATION OF INFORMATION SYSTEM BY USER

CLAIM OF PRIORITY

This application claims priority from Japanese patent application JP 2021-081016 filed on May 12, 2021, the content of which is hereby incorporated by reference into this application.

BACKGROUND

This disclosure relates to an evaluation system for evaluating a resource operation of an information system by a user.

Information systems, for example, storage systems and server systems, are not always managed by experts, and there is a demand to manage the information systems without time and labor even without skills. Such a demand is high especially in the midrange market. Therefore, it is required to achieve management by a simple operation with few errors in operation.

For example, in JP 2008-181279 A, there is disclosed a technology for displaying a confirmation screen when information input on an operation screen based on a graphical user interface (GUI) is received from a user. In this technology, a threshold value is set for each operation screen, and when a time period of operation on the operation screen is equal to or less than the threshold value, an alert screen is displayed by considering that there is a risk of an erroneous operation.

However, for example, management software for the information system may be capable of executing different types of resource operations on a single GUI screen. In addition, an erroneous operation risk in a resource operation differs depending on the resource operation. Therefore, a technology capable of more accurately evaluating erroneous operation risks of various resource operations is desired.

SUMMARY

According to at least one aspect of this disclosure, there is provided an evaluation system for evaluating a resource operation of an information system by a user, the evaluation system including: one or more arithmetic units; and one or more storage devices, the one or more storage devices being configured to store risk management information for managing an erroneous operation risk evaluation index relating to the resource operation of the information system, the one or more arithmetic units being configured to: receive operation information indicating a first resource operation designated by a first user; and evaluate an erroneous operation risk of the first resource operation based on the first resource operation and the risk management information.

According to at least one aspect of this disclosure, it is possible to evaluate more accurately the erroneous operation risks of the resource operations.

BRIEF DESCRIPTION OF THE DRAWINGS

FIG. 4 shows an example of the structure of the storage resource risk management table.

FIG. 5 shows an example of the structure of the storage operation risk management table.

FIG. 16 shows risk evaluation result examples of some resource operations.

DETAILED DESCRIPTION OF EMBODIMENTS

Figure 1:
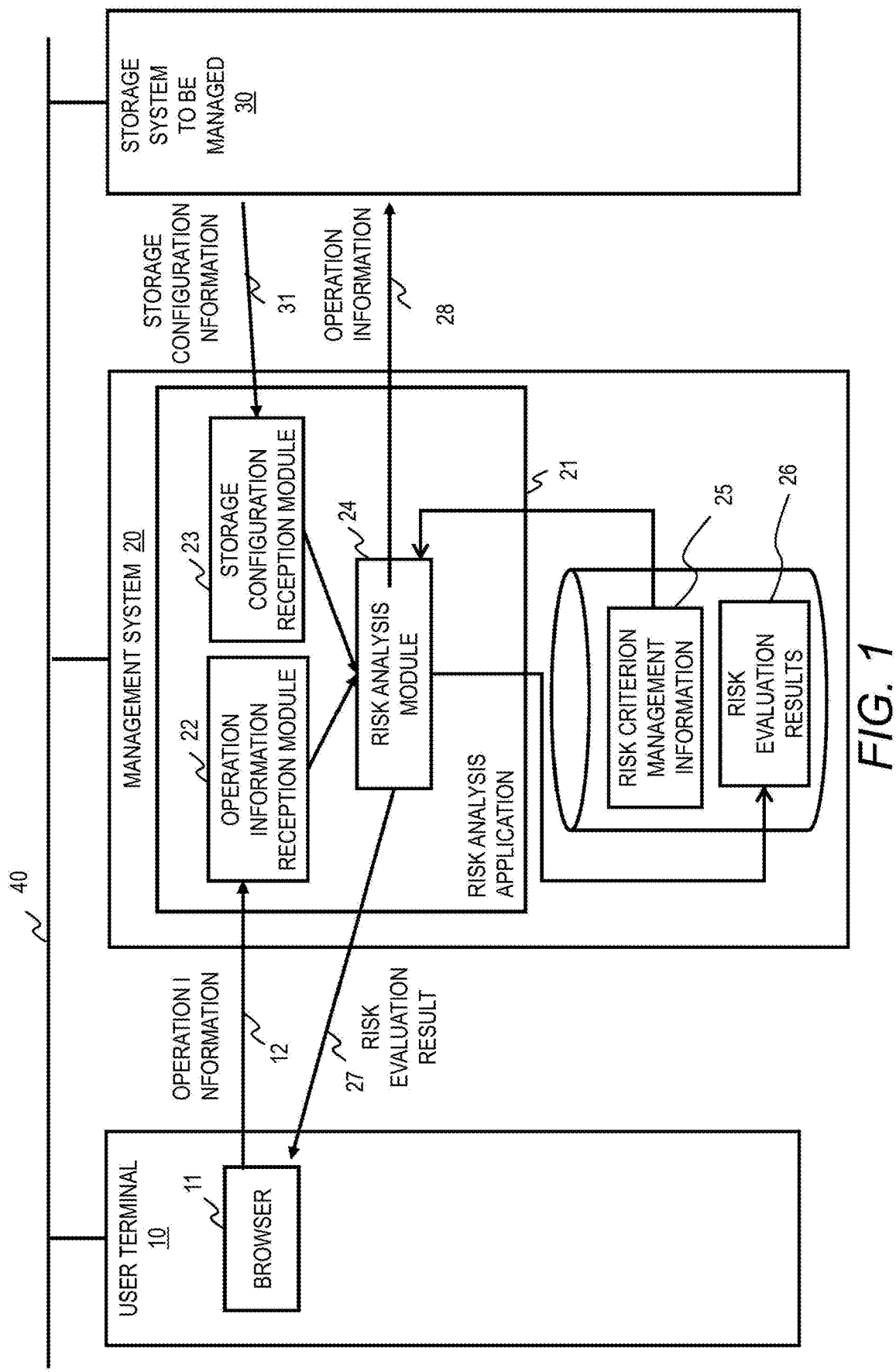
FIG. 1 is a diagram for schematically illustrating a configuration example of a computer system in a first embodiment of this disclosure.

The following description of this disclosure is divided into a plurality of sections or a plurality of embodiments if necessary for convenience. However, unless explicitly noted otherwise, the embodiments or sections are not irrelevant to one another, and one is related to another as a modification example, detailed or supplementary description, or the like of a part of or the entirety of another. When the count of pieces of a component or the like (including the count, numerical value, amount, and range of a component) is mentioned in the following description of this disclosure, this disclosure is not limited to the particular count mentioned and the component count can be higher or lower than the particular count, unless explicitly noted otherwise or unless it is theoretically obvious that the component count is limited to the particular count. In the following description, like components are denoted by like reference numerals/symbols.

This system may be a physical computer system (one or more physical computers), or may be a system built on a computational resource group (a plurality of computational resources), for example, a cloud infrastructure. The computer system or the computational resource group includes one or more interface devices (including, for example, a communication device and an input/output device), one or more storage devices (including, for example, a memory (main storage) and an auxiliary storage device), and one or more processors.

When a function is implemented by a processor executing a program, predetermined processing is appropriately performed through use of, for example, a storage device and/or an interface device, and hence the function may be set as at least a part of the processor. The processing described with the function as the subject may be set as processing performed by a processor or a system including the processor. The program may be installed from a program source. Examples of the program source may include a program distribution computer and a computer-readable storage medium (for example, a computer-readable non-transitory storage medium). The description of each function is merely an example, and a plurality of functions may be combined into one function, or one function may be divided into a plurality of functions.

Now, description is given of risk evaluation of an erroneous operation performed with respect to an information system by a user on a GUI screen in at least one embodiment of this disclosure. The risk evaluation of the erroneous operation involves evaluating a possibility that an operation executed by the user is an erroneous operation or a magnitude of an influence to be exerted when the operation is an erroneous operation. In the at least one embodiment of this disclosure, an erroneous operation risk evaluation index with respect to a resource operation of the information system by the user is held. In the at least one embodiment of this disclosure, a resource operation by the user on the screen for operating a resource of the information system is received, and the erroneous operation risk of the resource operation is evaluated based on the resource operation and the erroneous operation risk evaluation index. Thus, it is possible to more appropriately evaluate the erroneous operation of the resource operation of the information system by the user.

First Embodiment

FIG. 1 is a diagram for schematically illustrating a configuration example of a computer system in a first embodiment of this disclosure. FIG. 1 is an illustration of an example in which a user operates a resource of a storage system being one example of the information system. The computer system includes a user terminal 10, a management system 20, and a storage system 30 to be managed. The user terminal 10, the management system 20, and the storage system 30 can communicate to/from each other through a network 40.

The user can operate the resource of the storage system 30 through use of the user terminal 10. In the configuration example of FIG. 1, the user terminal executes a browser 11. The browser 11 is configured to receive, from the management system 20, data of an operation screen based on a graphical user interface (GUI) configured to allow the user to operate the resource of the storage system 30.

In the first embodiment of this disclosure, the user can operate a software resource including a volume of the storage system. The browser 11 is configured to transmit information (operation information) on the user operation on the GUI screen to the management system 20.

The management system 20 is configured to analyze and evaluate the erroneous operation risk of the resource operation of the storage system 30 by the user on the user terminal 10. In the configuration example of FIG. 1, the management system 20 executes a risk analysis application 21. The risk analysis application 21 is a program including an instruction code. The management system 20 further stores a database including risk criterion management information 25 being risk management information.

The risk analysis application 21 includes an operation information reception module 22, a storage configuration reception module 23, and a risk analysis module 24. The operation information reception module 22 is configured to receive information on the user's resource operation with respect to the storage system 30 from the browser 11 of the user terminal 10. The storage configuration reception module 23 is configured to receive storage configuration information 31 from the storage system 30 to be managed.

The storage configuration information 31 indicates a current state of the resource of the storage system 30. In the first embodiment of this disclosure, the storage configuration information 31 indicates a configuration of a resource being used and managed by each tenant (organization). The storage configuration information 31 may include information on the tenant to which the user belongs.

In the first embodiment of this disclosure, after the user logs in to the user terminal 10, the storage configuration reception module 23 acquires, from the storage system 30, information required for evaluating the erroneous operation risk of the user's operation. For example, when the user logs in with a tenant designated, the storage configuration reception module 23 requests the storage system 30 to transmit the storage configuration information with the tenant designated.

The risk analysis module 24 is configured to refer to the operation information received from the user terminal 10 to analyze the resource operation by the user, which is indicated by the operation information, and evaluate the erroneous operation risk. The risk analysis module 24 evaluates the erroneous operation risk of the user based on the storage configuration information 31 and the risk criterion management information 25.

The risk analysis module 24 is configured to store risk evaluation results 26 of user operations in the database. The risk analysis module 24 is also configured to transmit, when the risk evaluation result indicates a high erroneous operation risk, a risk evaluation result 27 indicating the high erroneous operation risk to the user terminal 10. As described later, the browser 11 displays an image corresponding to the risk evaluation result 27 to notify the user that the erroneous operation risk is high.

The risk analysis module 24 is configured to transmit, to the storage system 30, operation information 28 for instructing the resource operation received from the user terminal 10. In the first embodiment of this disclosure, the risk analysis module 24 transfers, to the storage system 30, a resource operation having a low erroneous operation risk, or a resource operation having a high erroneous operation risk, which has been reconfirmed by the user. The storage system 30 executes the instructed resource operation.

Figure 2:
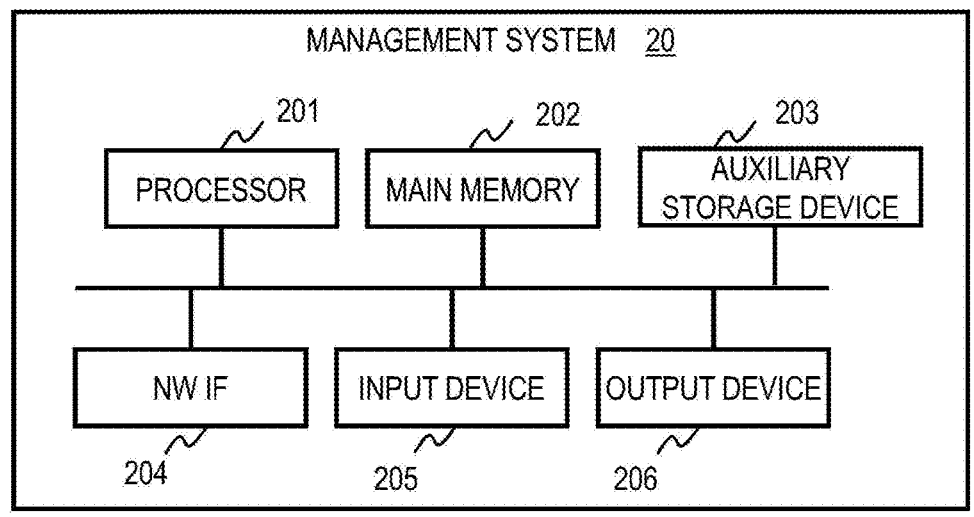
FIG. 2 is a diagram for illustrating an example of a hardware configuration of the management system.

FIG. 2 is a diagram for illustrating an example of a hardware configuration of the management system 20. The management system 20 includes: a processor 201 being an arithmetic unit having arithmetic performance; and a main memory 202 configured to provide a volatile temporary storage area for storing a program to be executed by the processor 201 and data.

The management system 20 further includes: a network interface (NW IF) 204 configured to perform data communication to/from other apparatus including the other apparatus in this system; and an auxiliary storage device 203 configured to provide a permanent information storage area using, for example, a hard disk drive (HDD) or a flash memory.

The management system 20 can also include: an input device 205 configured to receive an operation from an administrator (user); and an output device 206 configured to present an output result in each process to the administrator. As the input device 205, for example, a mouse or a keyboard can be included. The output device 206 is, for example, a monitor or a printer.

As described above, the management system 20 stores the of program of risk analysis application 21 including the operation information reception module 22, the storage configuration reception module 23, and the risk analysis module 24. The program to be executed by the processor and the data to be processed are loaded, for example, from the auxiliary storage device 203 into the main memory 202. The risk criterion management information 25 and the risk evaluation results 26 are stored in, for example, the auxiliary storage device 203.

The processor 201 is configured to operate as a functional unit for implementing functions specified by the program by executing the program stored in the main memory 202. For example, the processor 201 can function as an operation information reception module, a storage configuration reception module, and a risk analysis module by executing the above-mentioned program.

A hardware configuration of the user terminal 10 is not particularly limited. The user terminal 10 can have such a hardware configuration as illustrated in FIG. 2. The functions divided into a plurality of devices may be integrated into one device, or the above-mentioned plurality of devices functions may be distributed to a larger number of devices. In this manner, the management system configured to manage the resource operation by the user can include one or more storage devices and one or more processors.

Figure 3:
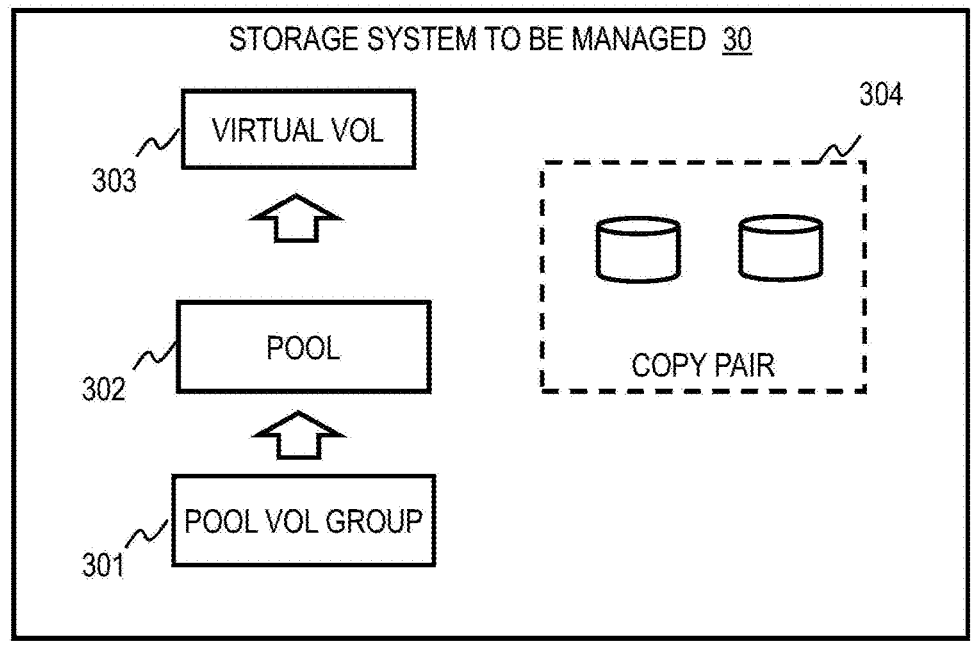
FIG. 3 is a diagram for schematically illustrating a configuration example of a software resource that can be operated by the user in the storage system to be managed.

FIG. 3 is a diagram for schematically illustrating a configuration example of a software resource that can be operated by the user in the storage system 30 to be managed. The storage system 30 includes one or more volumes (VOLs). In the configuration example of FIG. 3, the storage system 30 includes a pool volume group 301, a pool 302, and a virtual volume 303.

The pool volume group 301 is formed of one or more pool volumes. The pool volume is a logical volume, and a storage area from one or more physical storage devices (not shown) is allocated to a storage area of the pool volume. The pool 302 is a storage pool formed of a storage area of the pool volume group 301.

The virtual volume 303 is a volume to be directly accessed by a host. The virtual volume 303 is dynamically provided with the storage area of the pool 302 by so-called thin provisioning. More specifically, in accordance with data writing from the host, a storage area required for storing the written host data is allocated from the pool 302 to the virtual volume 303. Therefore, a capacity appears to the host of the virtual volume 303 to be smaller than the actual capacity of the virtual volume 303.

The storage system 30 further includes a copy pair 304. The copy pair is formed of two volumes. The two volumes are synchronously or asynchronously controlled to store the same data. A data update on one volume is synchronously or asynchronously reflected in the other volume. The two volumes may be stored in the same physical storage device, or may be stored in different physical storage devices located at sites distant from each other.

A storage resource to be operated by the user, which is illustrated in FIG. 3, is merely an example. The resource to be operated by the user and to have the erroneous operation risk evaluated by the management system 20 is not limited to the example of FIG. 3, and other resources may be risk management targets.

The storage system 30 can include one or more physical storage devices. The hardware configuration of the storage device can include, for example, one or more storage devices configured to store data from the host and one or more storage controllers configured to control access to the one or more storage devices. The storage device is, for example, an HDD or a solid state drive (SSD).

The storage controller can include a front-end interface for communication to/from the host, a processor, a memory, a cache memory, and a back-end interface for communication to/from the storage device. The processor operates in accordance with a program stored in the memory. In addition to those components, the storage controller can include a circuit for performing predetermined processing.

Now, an example of information included in the risk criterion management information 25 is described. As described below, the risk criterion management information 25 includes a storage resource risk management table 230, a storage operation risk management table 240, and a storage state risk management table 250.

FIG. 4 shows an example of the structure of the storage resource risk management table 230. The storage resource risk management table 230 is used to manage a risk factor for each resource type in the storage system 30. The risk factor is an example of the erroneous operation risk evaluation index.

The storage resource risk management table 230 includes a target resource type field 231 and a risk factor field 232. The target resource type field 231 indicates the type of the resource of the storage system 30 that can be a target of the user operation. The risk factor field 232 indicates the risk factor for each resource type. In this example, a larger risk factor indicates a higher erroneous operation risk. The same applies to the other tables.

FIG. 5 shows an example of the structure of the storage operation risk management table 240. The storage operation risk management table 240 is used to manage the risk factor of each resource operation type by the user with respect to the storage system 30. The risk factor for a resource operation that can be more easily restored to its original state becomes lower. The storage operation risk management table 240 includes a target resource type field 241, an operation type field 242, and a risk factor field 243.

The target resource type field 241 indicates the type of the resource of the storage system 30 that can be a target of the user operation. The operation type field 242 indicates an operation type with respect to each resource type indicated by the target resource type field 241. In the example of FIG. 5, "SHREDDING" of the volume means to completely erase data stored in the volume.

The risk factor field 243 indicates the risk factor for each operation type with respect to the resource type. In the configuration example of FIG. 5, "COMMON" in the target resource type field 241 indicates that the operation (record) can be applied to all resource types.

Figure 6:
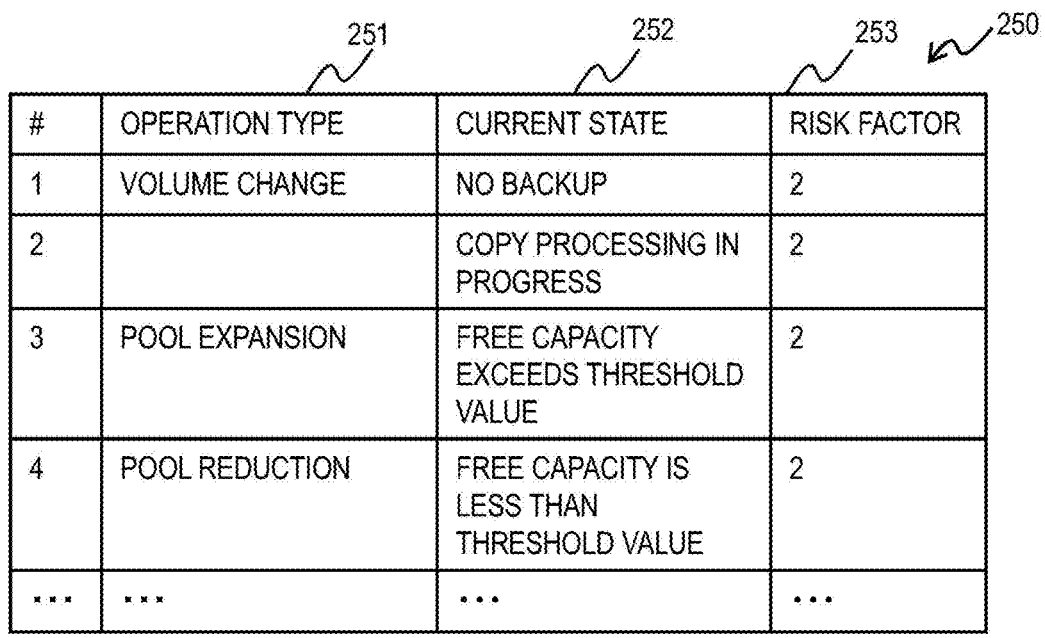
FIG. 6 shows an example of the structure of the storage state risk management table.

FIG. 6 shows an example of the structure of the storage state risk management table 250. The storage state risk management table 250 is used to manage the risk factor associated with a state of the resource to be operated in the storage system 30. A higher risk factor is assigned to a state that cannot be restored and a case in which there is a higher probability of an erroneous operation because the relevant operation is an unrequired operation in the current state.

For example, when there is no backup or the volume is changed during copy processing for backup, the original state cannot be restored, and hence a high risk factor is assigned. For example, expansion of a pool having a large amount of free capacity or reduction of a pool having a small amount of free capacity has a high probability of being an erroneous operation. The free capacity can be represented by, for example, an actual free capacity value or a ratio of a free space to a total capacity.

The storage state risk management table 250 includes an operation type field 251, a current state field 252, and a risk factor field 253. The operation type field 251 indicates an operation type with respect to the target resource type. Specifically, each record indicates a set of an operation target resource type and the operation type. The current state field 252 indicates the current state of the operation target resource. In the example of FIG. 6, "VOLUME CHANGE" means the shredding or deletion of a volume.

The risk factor field 253 indicates the risk factor associated with the set of the operation target resource type, the operation type, and the current state of the operation target. Specifically, the risk factor field 253 indicates the risk factor exhibited in a case in which the operation indicated by the operation type field 251 is executed when the resource type indicated by the operation type field 251 is in the state indicated by the current state field 252.

Next, an example of a risk evaluation method for a resource operation based on the risk criterion management information 25 is described. The risk analysis module 24 evaluates the erroneous operation risk of the resource operation by the user in terms of three axes based on each of the storage resource risk management table 230, the storage operation risk management table 240, and the storage state risk management table 250. This enables more accurate erroneous operation risk evaluation.

The risk analysis module 24 refers to operation information 12 received from the user terminal to identify the type of the operation target resource type. The risk analysis module 24 refers to the storage resource risk management table 230 to acquire the risk factor corresponding to the target resource type for the resource operation at this time. The value of this risk factor is a risk evaluation value in terms of the axis of the resource operation type.

In addition, the risk analysis module 24 refers to the operation information 12 received from the user terminal to identify the type of the resource operation. The risk analysis module 24 refers to the storage operation risk management table 240 to acquire the risk factor corresponding to the operation type with respect to the operation target resource type at this time. The value of this risk factor is a risk evaluation value in terms of the axis of the resource operation type.

In addition, the risk analysis module 24 refers to the storage state risk management table 250 to acquire the record corresponding to the operation type and the operation target resource type at this time. The risk analysis module 24 refers to the storage configuration information 31 received from the storage system 30 to identify the current state of the operation target resource indicated by the acquired record.

The risk analysis module 24 acquires the risk factor corresponding to the identified resource type, operation type, and current state from the storage state risk management table 250. The value of this risk factor is a risk evaluation value in terms of the axis of the current state of the operation target resource. When the current state of the operation target resource at this time does not match any one of the records of the storage state risk management table 250, the risk factor is determined to be 1.

The risk analysis module 24 determines a comprehensive risk evaluation value of the resource operation at this time from the risk evaluation values calculated in terms of the three axes in the above-mentioned manner. In the first embodiment of this disclosure, the risk analysis module 24 calculates the product of the risk evaluation values in terms of the three axes, and determines the calculated value as the comprehensive risk evaluation value of the resource operation.

Figure 7:
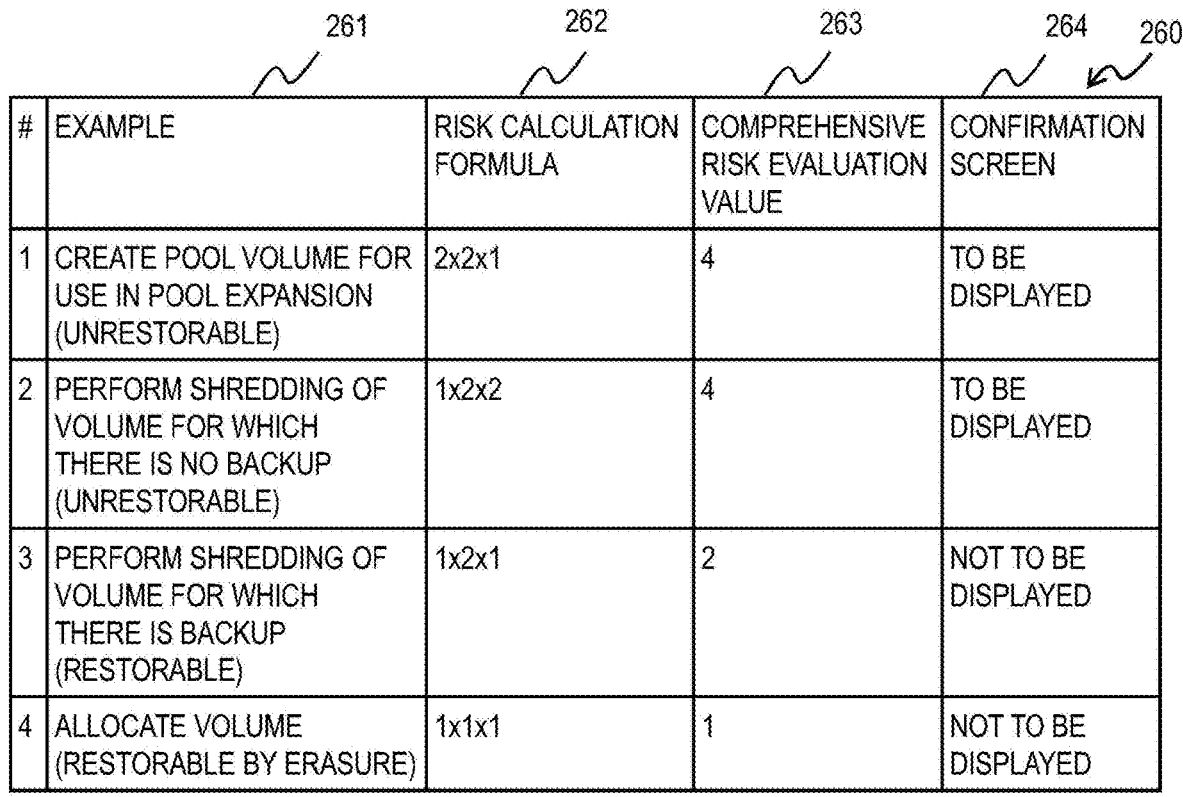
FIG. 7 shows risk evaluation result examples of some resource operations.

FIG. 7 shows risk evaluation result examples 260 of some resource operations. A field 261 indicates an example of the resource operation, and a field 262 indicates a risk calculation formula. A field 263 indicates the comprehensive risk evaluation value, and a field 264 indicates whether or not to display an operation confirmation screen on the user terminal 10.

A resource operation of an example 1 is to create a pool volume for use in the pool expansion. The target resource type of the example 1 is "POOL" having a risk factor of 2. The operation type is "EXPANSION" having a risk factor of 2. It is assumed that the free capacity of the pool in the current state is equal to or less than a threshold value. Therefore, the risk factor for the current state is 1. As a result, the comprehensive risk evaluation value of the resource operation of the example 1 is 4.

A resource operation of an example 2 is to perform shredding of a volume for which there is no backup. The target resource type of the example 2 is "VOLUME" having a risk factor of 1. The operation type is "SHREDDING" having a risk factor of 2. There is no backup of the volume. Therefore, the risk factor for the current state is 2. As a result, the comprehensive risk evaluation value of the resource operation of the example 2 is 4.

A resource operation of an example 3 is different from the resource operation of the example 2 in that there is a backup of a target volume. There is no record corresponding to the current state of the operation target in the storage state risk management table 250, and the risk factor is 1. Therefore, the comprehensive risk evaluation value of the resource operation of the example 3 is 2.

A resource operation of an example 4 is to allocate a new virtual volume to the host. The target resource type of the example 4 is "VOLUME" having a risk factor of 1. The operation type is "NEW CREATION" having a risk factor of 1. There is no record corresponding to the current state of the operation target in the storage state risk management table 250, and the risk factor is 1. Therefore, the comprehensive risk evaluation value of the resource operation of the example 4 is 1.

In the above-mentioned example, the risk evaluation values in terms of the three axes are calculated, but only the risk evaluation values in terms of some of those axes may be calculated. For example, the evaluation value in terms of only the resource operation type or the resource type may be used, or only the evaluation values in terms of those two axes may be used. Those also enable appropriate erroneous operation risk evaluation. In addition, the method of calculating the comprehensive risk evaluation value is not limited to the product of the risk evaluation values in terms of the axes, and another mathematical function may be used.

The risk analysis module 24 determines based on the comprehensive risk evaluation value whether or not to display the operation confirmation screen for the user. In the first embodiment of this disclosure, when the comprehensive risk evaluation value exceeds a threshold value, the risk analysis module 24 displays the operation confirmation screen on the user terminal 10 through the browser 11. FIG. 7 shows an example of displaying the operation confirmation screen when the comprehensive risk evaluation value is 4 or more.

A screen for confirming the resource operation is displayed for the user when the risk evaluation value is high, to thereby be able to effectively prevent an erroneous operation while suppressing a decrease in processing efficiency of the user operation. The risk analysis module 24 may store the risk evaluation results 26 in the database without displaying the operation confirmation screen. Thus, the administrator can perform later analysis.

Figure 8:
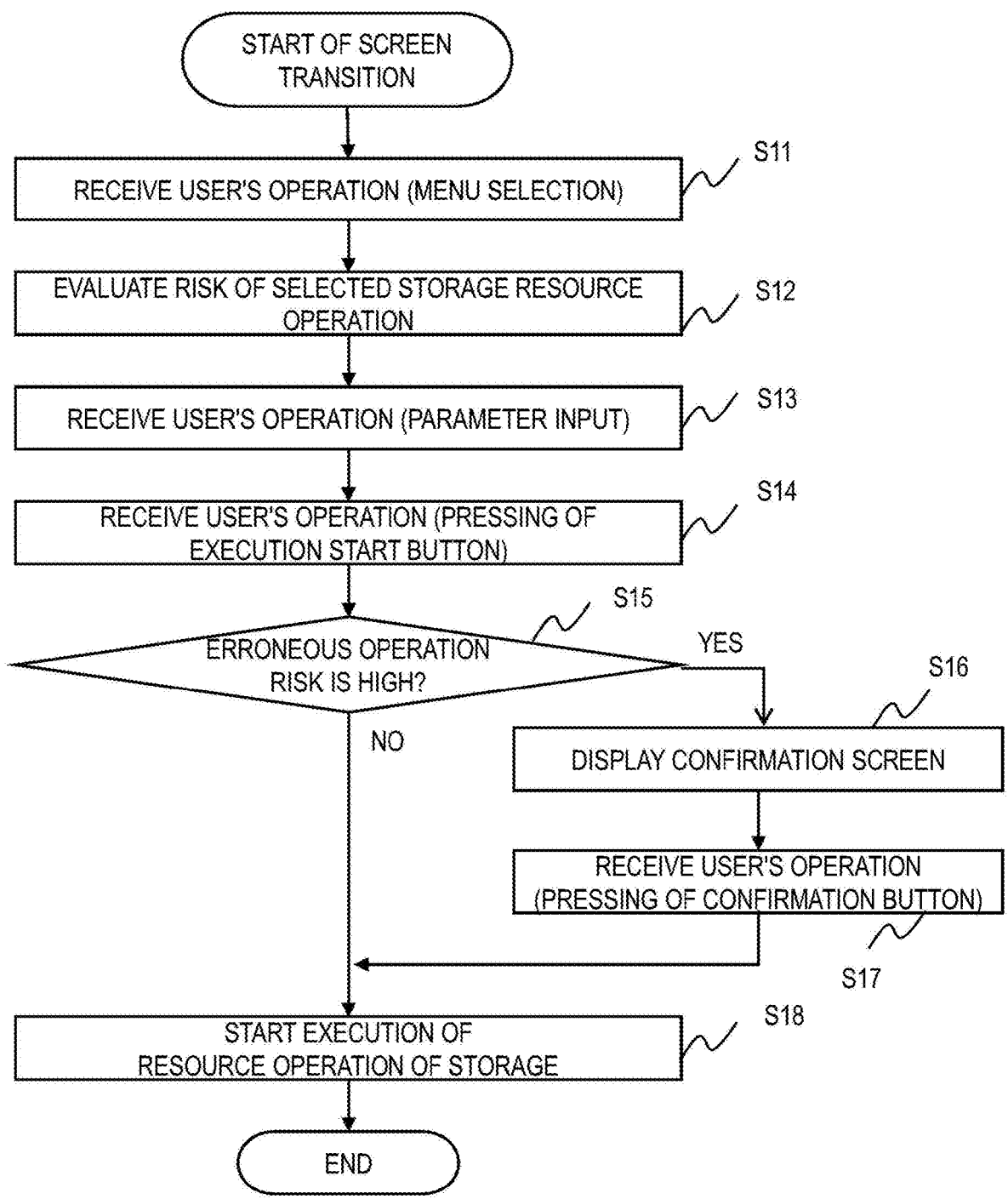
FIG. 8 is a flow chart for illustrating an example of user operation management processing to be performed by the management system.

FIG. 8 is a flow chart for illustrating an example of user operation management processing to be performed by the management system 20. Now, processing illustrated in a flow chart of FIG. 8 is described with reference to transition screens illustrated in FIG. 9A to FIG. 9D.

Figure 9A:
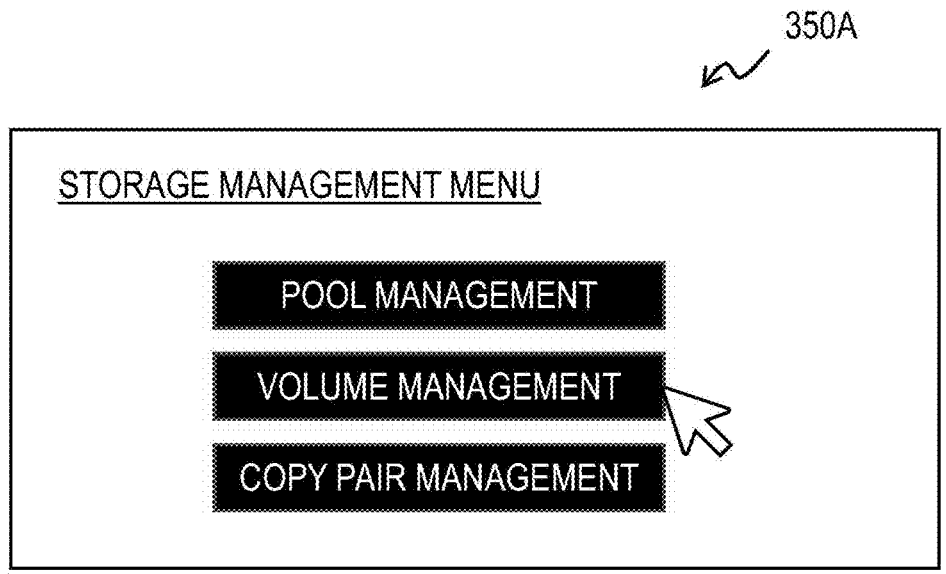
FIG. 9A to FIG. 9D shows transition screens to describe processing illustrated in a flow chart of FIG. 8.

In Step S11, the risk analysis module 24 transmits data of a storage management menu screen to the user terminal 10 in response to a request received from the browser 11 of the user terminal 10 after the user's login processing with the tenant designated. As illustrated in FIG. 9A, the browser 11 displays a storage management menu screen 350A. The browser 11 receives a menu selection performed by the user through the input device, and transmits the received information to the management system 20. In the example illustrated in FIG. 9A, "VOLUME MANAGEMENT" is selected.

The storage configuration reception module 23 requests the storage system 30 for required configuration information in accordance with the menu item selected by the user. In the example of FIG. 9A, in accordance with the selection of "VOLUME MANAGEMENT," the storage configuration reception module 23 requests the storage system 30 for information relating to the volume of the tenant designated by the user. The storage configuration reception module 23 receives the requested storage configuration information 31 from the storage system 30, and stores the received storage configuration information 31 in the main memory.

Figure 9B:
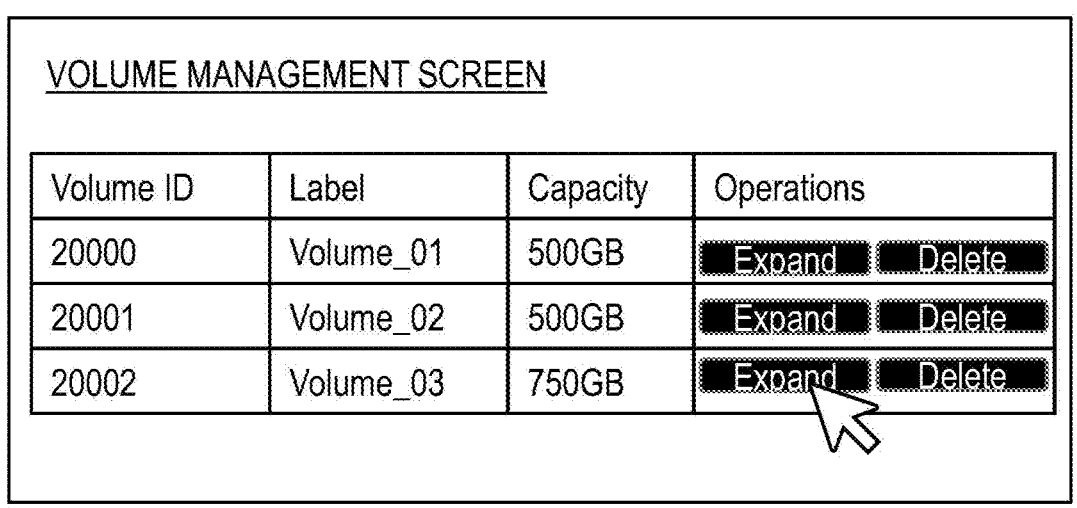

The risk analysis module 24 transmits data of the volume management screen to the user terminal 10. As illustrated in FIG. 9B, the browser 11 displays a volume management screen 350B. The volume management screen 350B presents information on the volume of the tenant designated by the user at the login. The volume is a volume to be accessed by the host of the tenant in order to read and write the host data. In the example of FIG. 3, the volume is a virtual volume.

In the example of FIG. 9B, a record of the volume indicates a volume ID, a volume label, a volume capacity, and buttons for selecting user operations with respect to the volume. The volume ID is a value for uniquely identifying the volume, and is determined by, for example, the storage system 30. The volume label is a name of the volume, which is given by the user.

In FIG. 9B, in order to facilitate illustration, expansion and deletion are illustrated as examples of the user operations with respect to the volume. Other operations with respect to the volume are conceivable, and examples thereof include shredding, attribute change, and new creation.

The browser 11 receives designation of an operation target volume and an operation, which is performed by the user through the input device, and transmits the designated information to the management system 20. The operation information reception module 22 receives the information on the user operation from the browser 11, and stores the received information in the main memory. In the example illustrated in FIG. 9B, "Expand" for the volume ID of "20002" is selected.

In Step S12, the management system 20 evaluates the risk of the selected storage resource operation. As described above, the risk analysis module 24 calculates the risk evaluation values in terms of the three axes of the resource operation based on information on the storage resource operation designated by the user, which includes the target resource type, the operation type, and the current state of the target resource. In addition, the comprehensive risk evaluation value is calculated from the risk evaluation values in terms of those three axes.

Figure 9C:
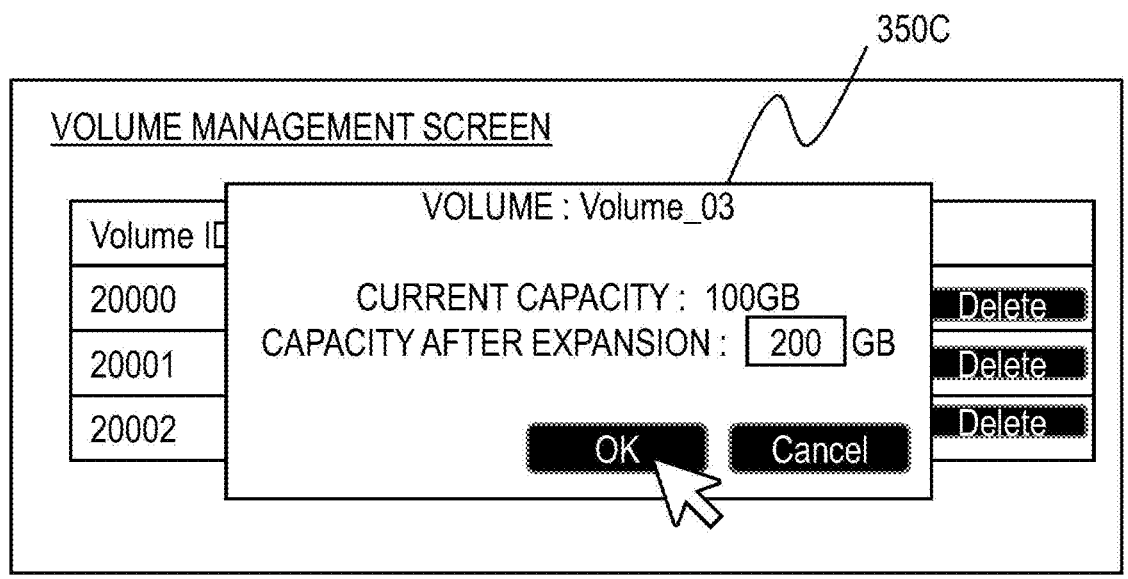

Subsequently, in Step S13, the management system 20 receives parameter input accompanying the user operation. FIG. 9C is an illustration of an example of a parameter input screen 350C for a volume operation, which is displayed by the browser 11. The browser 11 receives data of the parameter input screen 350C from the risk analysis module 24, and transmits a value of a parameter input by the user to the management system 20. The operation information reception module 22 receives the parameter from the browser 11, and stores the received parameter in the main memory.

In Step S14, the management system 20 receives the fact that the user has pressed an execution start button. FIG. 9C is an illustration of how an "OK" button indicating execution start is selected after the parameter input. The browser 11 notifies the management system 20 that the execution start button has been pressed by the user. The operation information reception module 22 receives the notification, and notifies the risk analysis module 24 to that effect.

In Step S15, the risk analysis module 24 determines whether or not the erroneous operation risk of the resource operation at this time is high. As described above, when the comprehensive risk evaluation value exceeds the threshold value, it is determined that the erroneous operation risk is high.

When the erroneous operation risk is low (NO in Step S15), in Step S18, the risk analysis module 24 transmits the operation information 28 indicating the resource operation designated by the user to the storage system 30. The storage system 30 discloses the processing requested by the operation information 28.

Figure 9D:
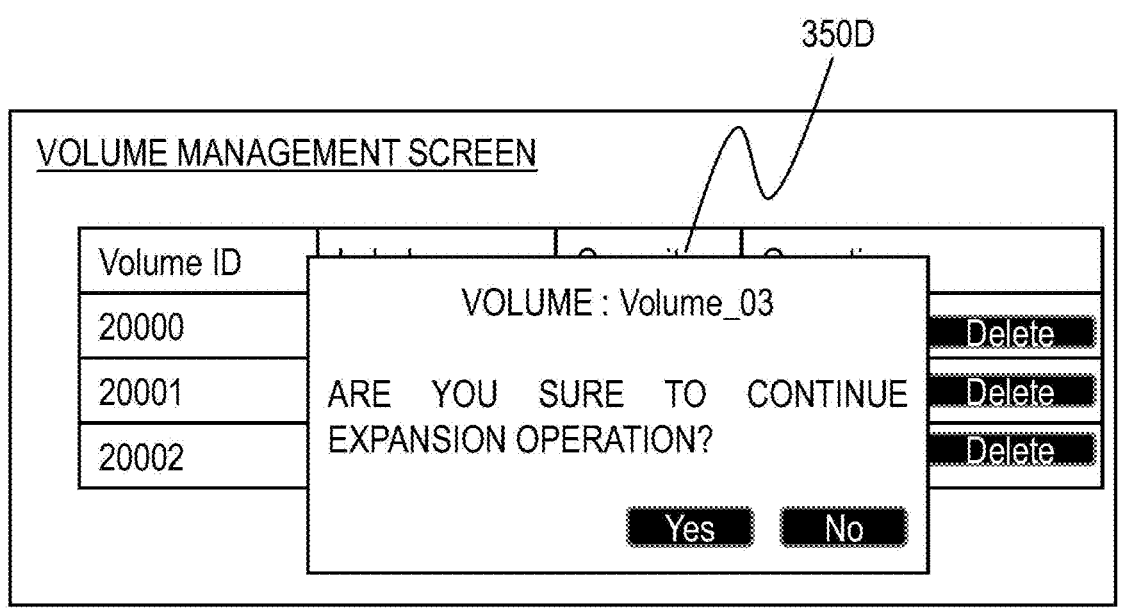

When the erroneous operation risk is high (YES in Step S15), in Step S16, the risk analysis module 24 transmits data of the operation confirmation screen to the user terminal 10. The browser 11 displays the operation confirmation screen. FIG. 9D is an illustration of an example of an operation confirmation screen 350D.

In Step S17, when the user presses a confirmation button, the browser 11 notifies the management system 20 to that effect. The risk analysis module 24 receives the fact that the user has pressed the confirmation button through the operation information reception module 22. In Step S18, the risk analysis module 24 transmits the operation information 28 indicating the resource operation designated by the user to the storage system 30. The storage system 30 discloses the processing requested by the operation information 28. When the user declines the user operation at this time, this flow is ended (not shown).

In the above-mentioned example, the resource operation of the storage system 30 being one example of the information system is described. A resource operation of a server system being another example of the information system is described below.

Figures 10, 11:
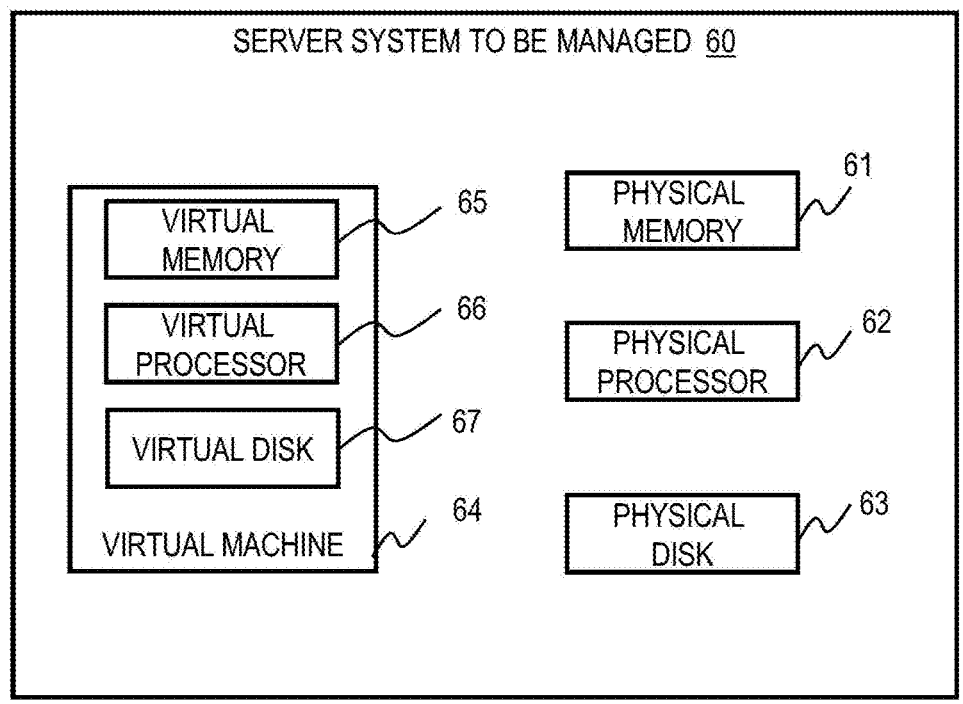
FIG. 10 is a schematic diagram for illustrating a logical configuration example of the server system to be operated.
FIG. 11 shows an example of the structure of the server resource risk management table.

FIG. 10 is a schematic diagram for illustrating a logical configuration example of the server system to be operated. A server system 60 includes a physical memory 61, a physical processor 62, and a physical disk 63. The physical disk 63 is an auxiliary storage device, and the physical memory 61 is a main memory device. The physical processor 62 is configured to operate in accordance with a program stored in the physical memory 61.

The server system 60 further includes a virtual machine 64. The virtual machine 64 includes a virtual memory 65, a virtual processor 66, and a virtual disk 67. The virtual machine 64 is software (program) to be executed by the physical processor 62. The resource that can be operated by the user in this example is a virtual machine in the server system.

Figure 12:
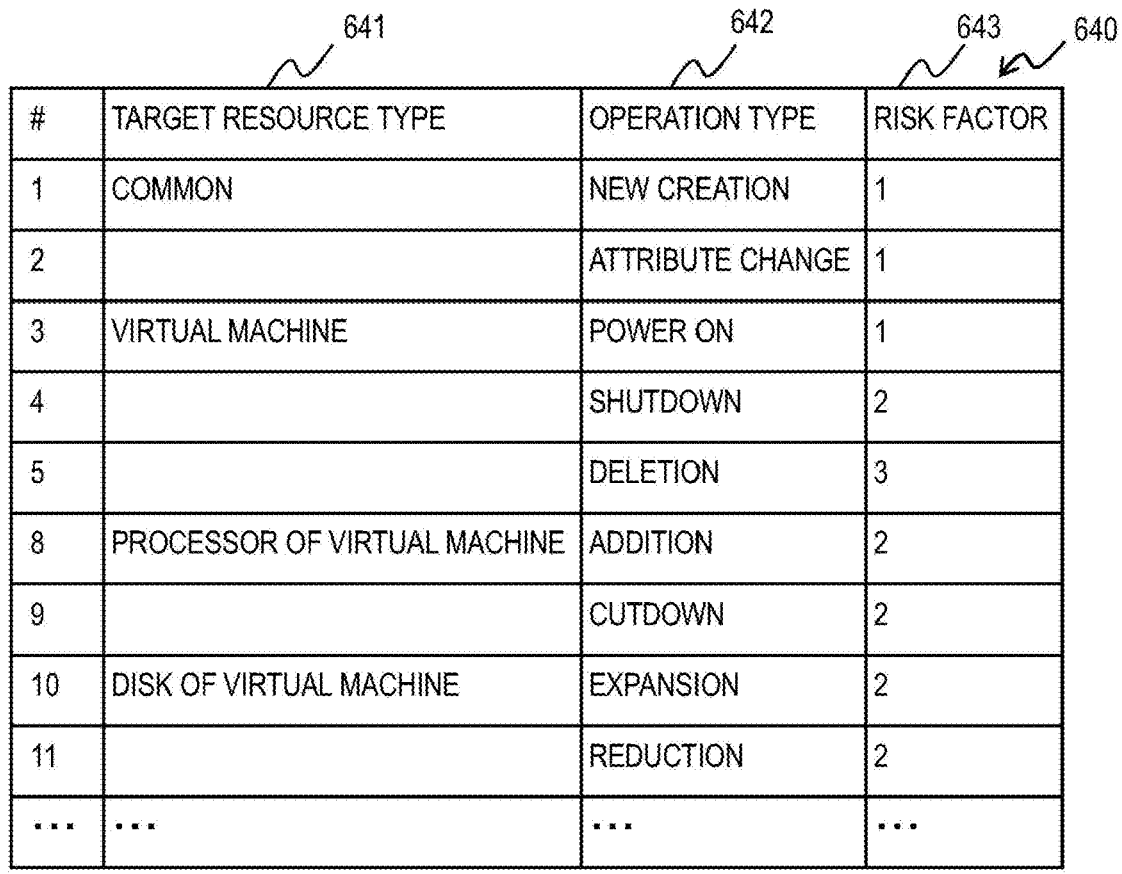
FIG. 12 shows an example of the structure of the server operation risk management table.
Figure 13:
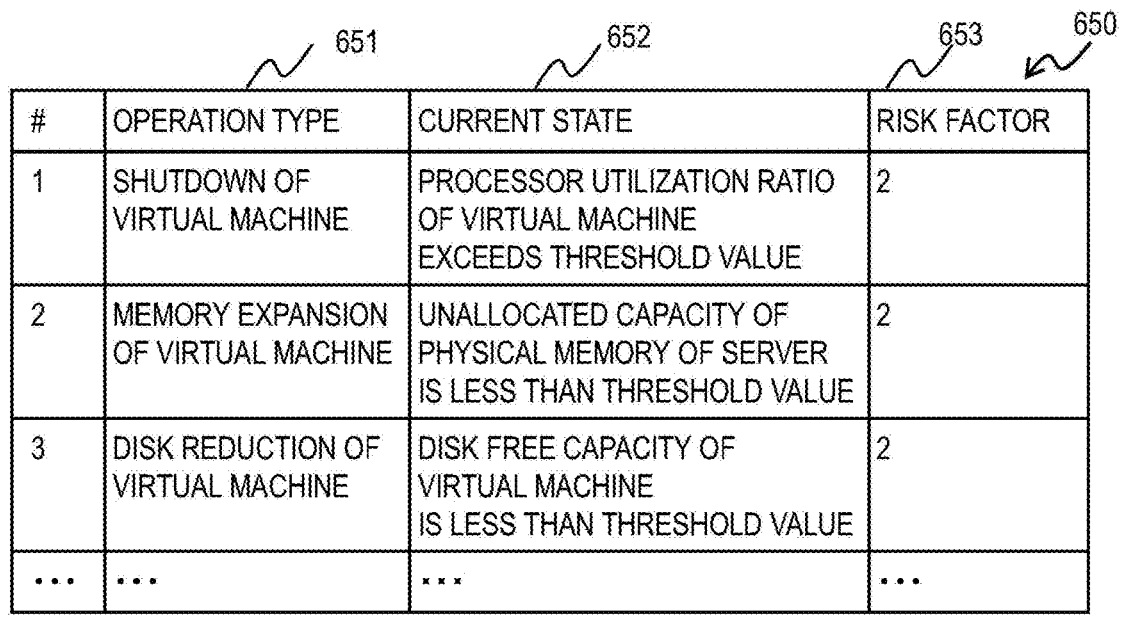
FIG. 13 shows an example of the structure of the server state risk management table.

The risk criterion management information 25 includes a server resource risk management table 630, a server operation risk management table 640, and a server state risk management table 650, which are shown in FIG. 11 to FIG. 13, respectively.

FIG. 11 shows an example of the structure of the server resource risk management table 630. The server resource risk management table 630 is used to manage a risk factor for each resource type in the server system 60.

The server resource risk management table 630 includes a target resource type field 631 and a risk factor field 632. The target resource type field 631 indicates the type of the resource of the server system 60 that can be a target of the user operation. The risk factor field 632 indicates the risk factor for each resource type.

FIG. 12 shows an example of the structure of the server operation risk management table 640. The server operation risk management table 640 is used to manage a risk factor of each resource operation type by the user with respect to the server system 60. The server operation risk management table 640 includes a target resource type field 641, an operation type field 642, a risk factor field 643.

The target resource type field 641 indicates the type of the resource of the server system 60 that can be a target of the user operation. The operation type field 642 indicates an operation type with respect to each resource type indicated by the target resource type field 641. The risk factor field 643 indicates the risk factor for each operation type with respect to the resource type.

FIG. 13 shows an example of the structure of the server state risk management table 650. The server state risk management table 650 is used to manage a risk factor associated with a state of the resource to be operated in the server system 60. The server state risk management table 650 includes an operation type field 651, a current state field 652, and a risk factor field 653. The operation type field 651 indicates an operation type with respect to the target resource type. Specifically, each record indicates a set of the operation target resource type and the operation type. The current state field 652 indicates the current state of the operation target resource.

The risk factor field 653 indicates the risk factor associated with the set of the operation target resource type, the operation type, and the current state of the operation target. The risk factor field 653 indicates the risk factor exhibited in a case in which the operation indicated by the operation type field 651 is executed when the resource type indicated by the operation type field 651 is in the state indicated by the current state field 652.

The risk evaluation method for the resource operation of the server system 60 by the management system 20 is the same as described in regard to the storage system 30, and a detailed description thereof is omitted. Processing for the server system 60 is different from the processing for the storage system in details of the risk criterion management information 25 to be referred to for the risk evaluation and details of the configuration information to be acquired from the server system 60.

Second Embodiment

A risk evaluation method for a resource operation in a second embodiment of this disclosure is described. In the second embodiment, the erroneous operation risk is evaluated based on information relating to the user who instructs the resource operation in addition to the information relating to the resource operation. This enables the erroneous operation risk of the resource operation to be evaluated more appropriately. Now, differences from the management of the storage resource in the first embodiment are mainly described.

User-related information to be referred to for the risk evaluation can include information relating to the tenant (organization) to which the user belongs. The user-related information can also include information relating to the user operation of the input device on the resource operation screen displayed by the user terminal 10.

Figure 14:
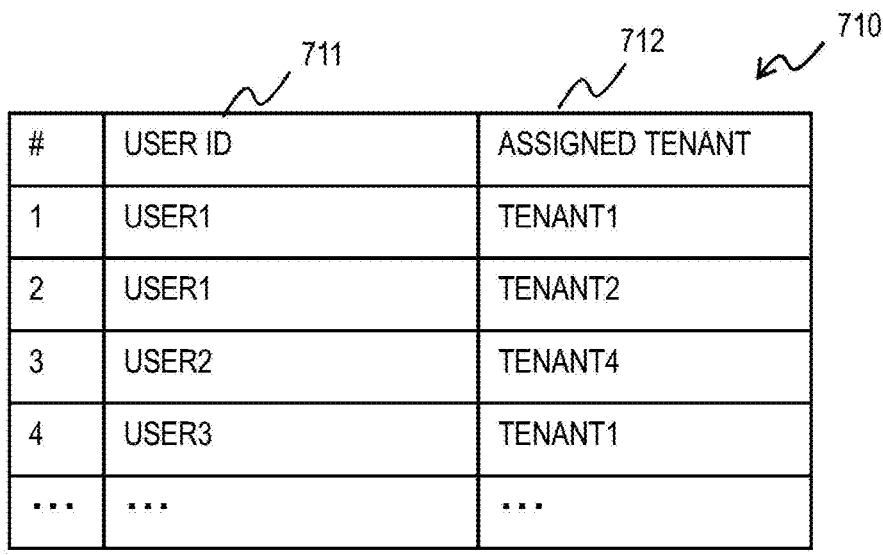
FIG. 14 shows an example of the structure of a user-assigned tenant management table used to manage information on the tenant to which the user who operates the server resource belongs.

FIG. 14 shows an example of the structure of a user-assigned tenant management table 710 used to manage information on the tenant to which the user who operates the server resource belongs. The information stored in the user-assigned tenant management table 710 is included in the storage configuration information 31 received from the storage system 30. The user-assigned tenant management table 710 includes a user ID field 711 and an assigned tenant field 712.

The user belongs to one or more tenants. In addition, the user can log in to the management system 20 for each tenant to which the user belongs. For example, the user can designate, on the login screen, the tenant for which the resource operation is to be performed. The user can simultaneously log in to a plurality of tenants for resource operations therefor.

Figure 15:
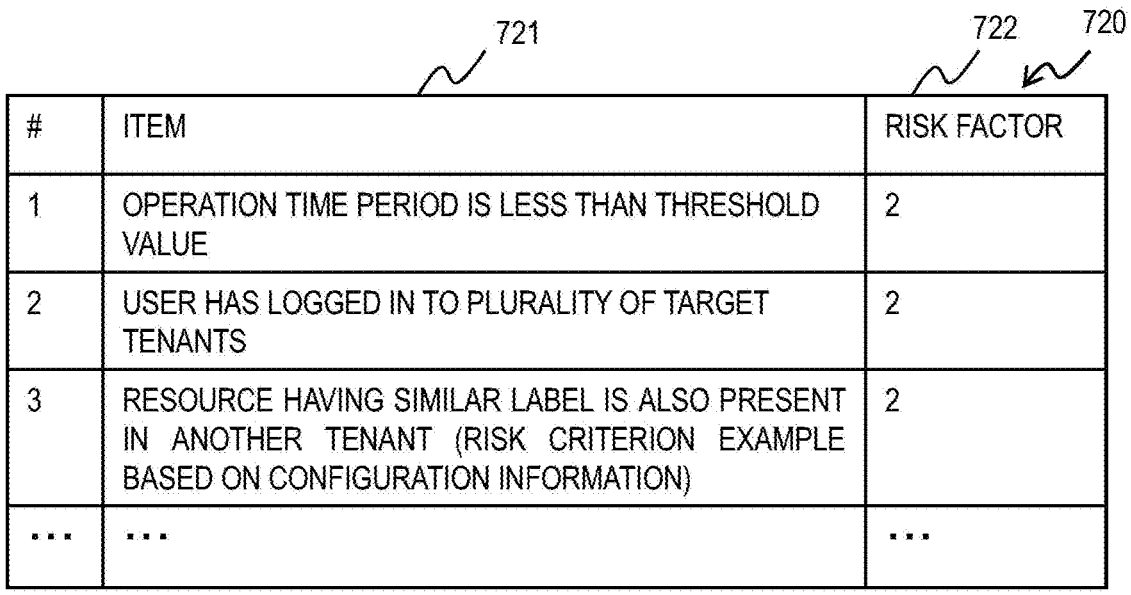
FIG. 15 shows an example of the structure of a user-related risk management table.

FIG. 15 shows an example of the structure of a user-related risk management table 720. The user-related risk management table 720 is used to manage a relationship between an item relating to the user who performs the resource operation and the risk factor. The risk criterion management information 25 includes the user-related risk management table 720 in addition to the storage resource risk management table 230, the storage operation risk management table 240, and the storage state risk management table 250.

The user-related risk management table 720 includes an item field 721 and a risk factor field 722. The item field 721 indicates an item relating to the user who performs the resource operation of the server system 60. In the example of the user-related risk management table 720 of FIG. 15, items having a risk factor of 2 or more (high risk factor) are shown. When there is no corresponding item in the user-related risk management table 720, the risk factor is determined to be 1.

FIG. 15 shows an example of three items. Those are an item for specifying the conditions for the user's operation time period on the resource operation screen and items relating to the tenant to which the user belongs. Specifically, the first item example is that the operation time period of the user terminal for the resource operation by the user is less than a threshold value. Conditions for starting and ending measurement of the operation time period are set in advance. The operation time period being short indicates that the user may not be operating with proper judgment.

The second item example is that one user has logged in to a plurality of target tenants. When the user has logged in to a plurality of tenants, there is such a probability that the user may operate a resource of a tenant different from the intended tenant. The risk factor exhibited when the number of tenants during the resource operation is 1 or less is smaller than the risk factor exhibited when the number of tenants during the resource operation is more than 1, and is 1 in this example.

The third item example is that the user belongs to a plurality of tenants, and a resource B having the same label as that of a resource A to be currently operated is present in a tenant different from the tenant to which the resource A to be operated belongs. When a resource having the same label is present in a tenant different from the tenant of the resource to be currently operated, there is such a probability that the resource operation may be an erroneous operation.

Next, an example of the erroneous operation risk evaluation method for a resource operation is described. The risk analysis module 24 calculates a risk evaluation value based on the above-mentioned user-related item (user-related condition) in addition to the risk evaluation values in terms of the three axes relating to the resource operation, which is described in the first embodiment. The comprehensive risk evaluation value is calculated based on those plurality of risk evaluation values. A more specific example thereof is described below.

The calculation of the risk evaluation values in terms of the three axes relating to the resource operation is as described in the first embodiment. The risk evaluation method for the user-related item is described. The risk analysis module 24 determines whether or not an instruction of the resource operation by the user corresponds to one or more items of the user-related risk management table 720. The instruction of the resource operation may apply to a plurality of items in the user-related risk management table 720.

For example, the risk analysis module 24 can determine the sum of the risk factors of the corresponding items in the user-related risk management table 720 as a user-related risk evaluation value. A calculation method therefor is set in advance, and another mathematical function, for example, the product, may be used.

In addition, the risk analysis module 24 calculates the comprehensive risk evaluation value from the risk evaluation values in terms of the three axes relating to the resource operation and the above-mentioned user-related risk evaluation value. For example, the product of those risk evaluation values can be determined as the comprehensive risk evaluation value.

FIG. 16 shows risk evaluation result examples 740 of some resource operations. A field 741 indicates an example of the resource operation. A field 742 indicates whether or not the user has logged in to a plurality of tenants during the resource operation. A field 743 indicates a risk calculation formula. A field 744 indicates the comprehensive risk evaluation value. A field 745 indicates whether or not to display the confirmation screen for the resource operation on the user terminal.

In this case, an example 2 and an example 4 are described. A resource operation of the example 2 is shredding of a volume for which there is a backup. In this resource operation, the user has logged in to a plurality of tenants. The risk calculation formula is "(1×2×1)×2". The first three numbers in parentheses indicate the risk evaluation values in terms of the three axes relating to the resource operation. The last number indicates the risk evaluation value of the user-related item.

The target resource type of the example 2 is "VOLUME" having a risk factor of 1. The operation type is "SHREDDING" having a risk factor of 2. There is a backup of the volume. Therefore, the risk factor for the current state is 1. The user is operating resources of a plurality of tenants, and the user-related risk factor is 2. It is assumed that the other user-related items do not apply to the current user. As a result, the comprehensive risk evaluation value of the resource operation of the example 2 is 4.

A resource operation of the example 4 is different from the resource operation of the example 2 in the number of tenants to which the user has logged in. Specifically, in the example 4, the number of tenants to which the user has logged in is 1. Therefore, the risk factor of the user-related item is 1. As a result, the comprehensive risk evaluation value of the resource operation of the example 4 is 2.

In the example shown in FIG. 16, the risk analysis module 24 displays the operation confirmation screen when the comprehensive risk evaluation value is 4 or more. The screen for confirming the resource operation is displayed for the user when the risk evaluation value is high, to thereby be able to effectively prevent an erroneous operation while suppressing a decrease in processing efficiency of the user operation. The risk analysis module 24 may store the risk evaluation results 26 in the database without displaying the operation confirmation screen. Thus, the administrator can perform later analysis.

Figure 17:
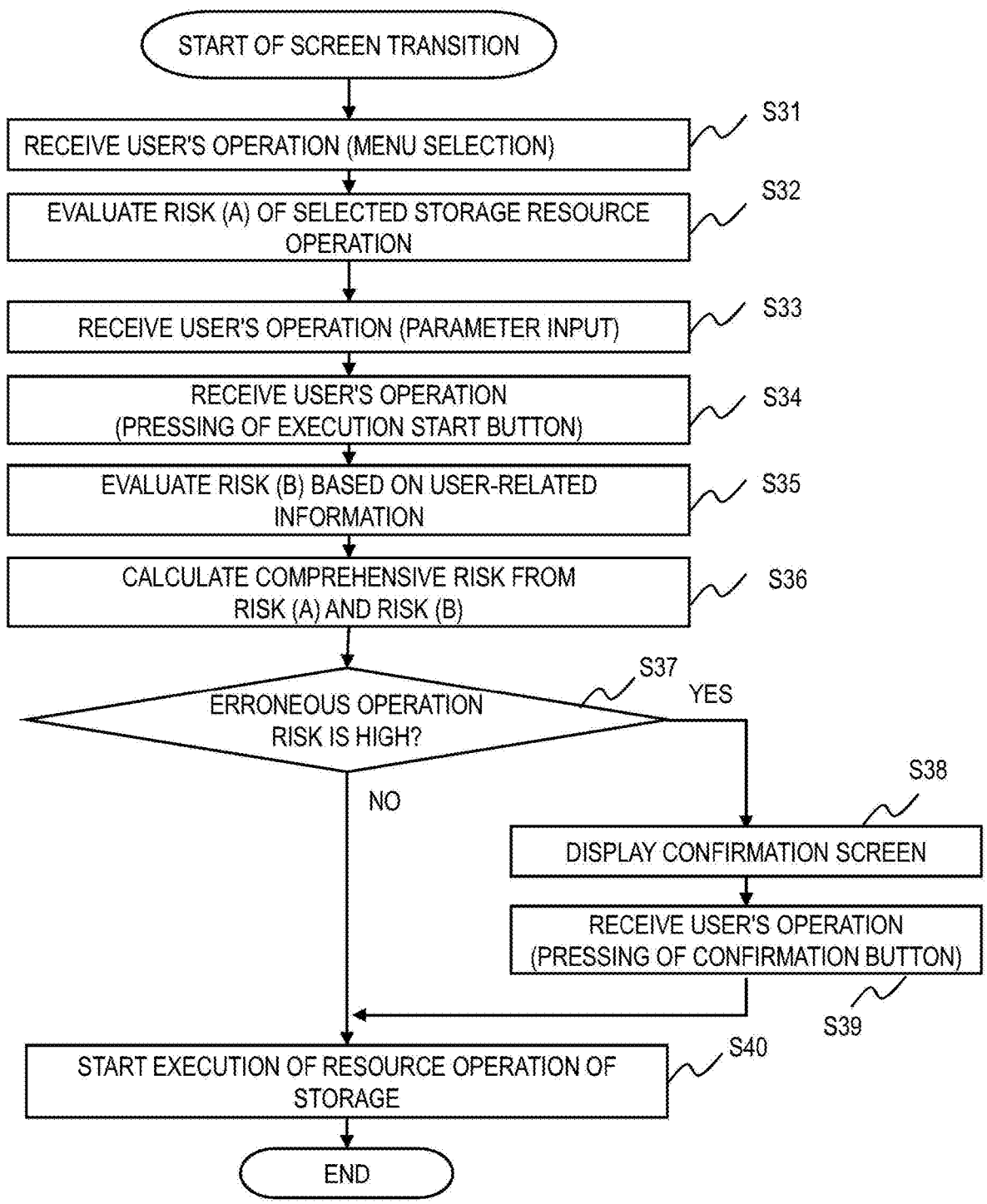
FIG. 17 is a flow chart for illustrating an example of user operation management processing to be performed by the management system.

FIG. 17 is a flow chart for illustrating an example of user operation management processing to be performed by the management system 20. In Step S31, the risk analysis module 24 transmits data of the storage management menu screen to the user terminal 10 in response to a request received from the browser 11 of the user terminal 10 after the user's login processing with the tenant designated. As described above, the user can perform login processing with different tenants designated on a plurality of login screens. The storage configuration reception module 23 requests the storage system 30 for required configuration information based on the input login information. The configuration information includes information on the tenant to which the user belongs.

The browser 11 receives a menu selection performed by the user through the input device, and transmits the received information to the management system 20. The storage configuration reception module 23 requests the storage system 30 for required configuration information in accordance with the menu item selected by the user. The storage configuration reception module 23 receives the requested storage configuration information 31 from the storage system 30, and stores the received storage configuration information 31 in the main memory.

The risk analysis module 24 transmits data of the designated management screen to the user terminal 10. The browser 11 displays a predetermined management screen. The browser 11 receives designation of an operation target and an operation, which is performed by the user through the input device, and transmits the designated information to the management system 20. The operation information reception module 22 receives the information on the user operation from the browser 11, and stores the received information in the main memory.

In Step S32, the management system 20 evaluates the risk of the selected storage resource operation. As described above, the risk analysis module 24 calculates risk evaluation values A in terms of the three axes of the resource operation based on the information on the storage resource operation designated by the user, which includes the target resource type, the operation type, and the current state of the target resource.

Subsequently, in Step S33, the management system 20 receives parameter input accompanying the user operation. The browser 11 receives the data of the parameter input screen 350C from the risk analysis module 24, and transmits the value of a parameter input by the user to the management system 20. The operation information reception module 22 receives the parameter from the browser 11, stores the received parameter in the main memory, and notifies the risk analysis module 24 to that effect. The risk analysis module 24 starts measurement of the user operation time period from the transmission of the parameter screen.

In Step S34, the management system 20 receives the fact that the user has pressed the execution start button. The browser 11 notifies the management system 20 that the execution start button has been pressed by the user. The operation information reception module 22 receives the notification, and notifies the risk analysis module 24 to that effect. The risk analysis module 24 ends the measurement of the user operation time period in response to the pressing of the execution start button.

In Step S35, the risk analysis module 24 calculates a risk evaluation value B based on the user-related information. This method of calculating the risk evaluation value is as described above. Information regarding the tenant to which the user belongs can be obtained from the user-assigned tenant management table 710. The operation time period of the user terminal 10 by the user can be measured as described above.

In Step S36, the risk analysis module 24 calculates the comprehensive risk evaluation value. As described above, the risk analysis module 24 can calculate the comprehensive risk evaluation value from the three risk evaluation values A relating to the resource operation and the user-related risk evaluation value.

In Step S37, the risk analysis module 24 determines whether or not the erroneous operation risk of the resource operation at this time is high. As described above, when the comprehensive risk evaluation value exceeds the threshold value, it is determined that the erroneous operation risk is high.

When the erroneous operation risk is low (NO in Step S37), in Step S40, the risk analysis module 24 transmits the operation information 28 indicating the resource operation designated by the user to the storage system 30. The storage system 30 discloses the processing requested by the operation information 28.

When the erroneous operation risk is high (YES in Step S37), in Step S38, the risk analysis module 24 transmits the data of the operation confirmation screen to the user terminal 10. The browser 11 displays the operation confirmation screen.

In Step S39, when the user presses the confirmation button, the browser 11 notifies the management system 20 to that effect. The risk analysis module 24 receives the fact that the user has pressed the confirmation button through the operation information reception module 22. In Step S40, the risk analysis module 24 transmits the operation information 28 indicating the resource operation designated by the user to the storage system 30. The storage system 30 discloses the processing requested by the operation information 28.

When the user declines the user operation at this time, this flow is ended (not shown). The above-mentioned user-related risk evaluation value can be used for evaluating the erroneous operation risk in the resource operation of an information system different from the storage system, for example, of the server system.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings show control lines and information lines as considered necessary for explanations but do not show all control lines or information lines in the products. It can be considered that almost of all components are actually interconnected.

What is claimed is:

1. An evaluation system for evaluating a resource operation of an information system by a user, the evaluation system comprising:
one or more arithmetic units; and
one or more storage devices,
the one or more storage devices being configured to provide storage configuration information and store risk management information for managing an erroneous operation risk evaluation index relating to the resource operation of the information system,
the one or more arithmetic units being configured to:
receive operation information indicating a first resource operation and a second resource operation designated by a first user;
the operation information further indicating for each of the first and second resource operation:
an operation target resource type; and
an operation type,
wherein the operation target resource type and the operation type each have a respective risk factor corresponding to each of the first and second resource operation,
the storage configuration information indicating for each of the first and second resource operation:
a current state of the operation target resource type,
wherein the current state of the operation target resource type has a risk factor corresponding to each of the first and second resource operation,
evaluate an erroneous operation risk of the first resource operation based on the first resource operation and the risk management information;
evaluate a second erroneous operation risk of the second resource operation based on the second resource operation and the risk management information;
calculate the comprehensive risk evaluation value from the erroneous operation risk and the second erroneous operation risk, wherein a calculation of the comprehensive risk evaluation is based upon:
the operation target resource type;
the operation type; and
the current state of the operation target resource type; and
evaluate whether the comprehensive risk evaluation value is greater than a threshold,
on a condition that the comprehensive risk evaluation value is greater than the threshold, present, a screen for confirming the first resource operation to the first user, and
on a condition that the comprehensive risk evaluation value is less than or equal to the threshold, transmit the operation information,
wherein for each of the first and second resource operation, whether the comprehensive risk evaluation value is greater than the threshold is based on a product of the risk factors of the operation target resource type, the operation type, and the current state of the operation target resource type.

2. The evaluation system according to claim 1, wherein the erroneous operation risk evaluation index of the risk management information comprises an erroneous operation risk evaluation index associated with a resource operation type for the resource operation of the information system, and
wherein the one or more arithmetic units are configured to evaluate the erroneous operation risk of the first resource operation based on the resource operation type for the first resource operation and the risk management information.

3. The evaluation system according to claim 1, wherein the erroneous operation risk evaluation index of the risk management information comprises an erroneous operation risk evaluation index associated with a target resource type for the resource operation of the information system, and
wherein the one or more arithmetic units are configured to evaluate the erroneous operation risk of the first resource operation based on the target resource type for the first resource operation and the risk management information.

4. The evaluation system according to claim 1, wherein the erroneous operation risk evaluation index of the risk management information comprises an erroneous operation risk evaluation index associated with a current state of a target resource for the resource operation of the information system, and
wherein the one or more arithmetic units are configured to evaluate the erroneous operation risk of the first resource operation based on the current state of the target resource of the first resource operation and the risk management information.

5. The evaluation system according to claim 1, wherein the information system is a storage system, and wherein a resource of the information system comprises a volume.

6. The evaluation system according to claim 1, wherein the erroneous operation risk evaluation index of the risk management information comprises an erroneous operation risk evaluation index relating to a tenant to which the user belongs,
wherein the one or more storage devices comprise information on the tenant to which the first user belongs, and
wherein the one or more arithmetic units are configured to evaluate the erroneous operation risk of the first resource operation by the first user based on the information on the tenant to which the first user belongs and the risk management information.

7. The evaluation system according to claim 6, wherein the erroneous operation risk indicated by the risk management information is higher when the user is operating resources of a plurality of tenants than when the user is operating a resource of a single tenant.

8. The evaluation system according to claim 2, wherein the erroneous operation risk evaluation index of the risk management information comprises an erroneous operation risk evaluation index associated with a target resource type for the resource operation of the information system, and
wherein the one or more arithmetic units are configured to evaluate the erroneous operation risk of the first resource operation based on the target resource type for the first resource operation and the risk management information.

9. The evaluation system according to claim 2, wherein the erroneous operation risk evaluation index of the risk management information comprises an erroneous operation risk evaluation index associated with a current state of a target resource for the resource operation of the information system, and
wherein the one or more arithmetic units are configured to evaluate the erroneous operation risk of the first resource operation based on the current state of the target resource of the first resource operation and the risk management information.

10. The evaluation system according to claim 2, wherein the erroneous operation risk evaluation index of the risk management information comprises an erroneous operation risk evaluation index relating to a tenant to which the user belongs,
wherein the one or more storage devices comprise information on the tenant to which the first user belongs, and
wherein the one or more arithmetic units are configured to evaluate the erroneous operation risk of the first resource operation by the first user based on the information on the tenant to which the first user belongs and the risk management information.

11. The evaluation system according to claim 10, wherein the erroneous operation risk indicated by the risk management information is higher when the user is operating resources of a plurality of tenants than when the user is operating a resource of a single tenant.

12. A method of evaluating, by an evaluation system, a resource operation of an information system by a user, the evaluation system being configured to provide storage configuration information and store risk management information for managing an erroneous operation risk evaluation index relating to the resource operation of the information system, the method comprising:
receiving, by the evaluation system, operation information indicating a first resource operation designated by a first user and a second resource operation designated by the first user,
the operation information further indicating for each of the first and second resource operation:
an operation target resource type; and
an operation type;
wherein the operation target resource type and the operation type each have a respective risk factor corresponding to each of the first and second resource operation, the storage configuration information indicating for each of the first and second resource operation:
a current state of the operation target resource type, wherein the current state of the operation target resource type has a risk factor corresponding to each of the first and second resource operation,
evaluating, by the evaluation system, an erroneous operation risk of the first resource operation based on the first resource operation and the risk management information;
evaluating a second erroneous operation risk of the second resource operation based on the second resource operation and the risk management information;
calculating the comprehensive risk evaluation value from the erroneous operation risk and the second erroneous operation risk, wherein a calculation of the comprehensive risk evaluation is based upon:
the operation target resource type;
the operation type; and
the current state of the operation target resource type; and evaluating whether the comprehensive risk evaluation value is greater than a threshold,
on a condition that the comprehensive risk evaluation value is greater than the threshold, present, a screen for confirming the first resource operation to the first user, and
on a condition that the comprehensive risk evaluation value is less than or equal to the threshold, transmit the operation information,
wherein for each of the first and second resource operation, whether the comprehensive risk evaluation value is greater than the threshold is based on a product of the risk factors of the operation target resource type, the operation type, and the current state of the operation target resource type.

13. The evaluation system according to claim 1, wherein the second resource operation includes information related to an organization to which the user belongs.

* * * * *